(12) United States Patent
Ishihara (10) Patent No.: US 8,869,930 B2
(45) Date of Patent: Oct. 28, 2014

(54) VEHICLE STEERING SYSTEM

(71) Applicant: JTEKT Corporation, Osaka (JP)

(72) Inventor: Atsushi Ishihara, Sakurai (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/768,578

(22) Filed: Feb. 15, 2013

(65) Prior Publication Data

US 2013/0218418 A1 Aug. 22, 2013

(30) Foreign Application Priority Data

Feb. 17, 2012 (JP) ................................. 2012-032761
Feb. 8, 2013 (JP) ................................. 2013-023008

(51) Int. Cl.
*B62D 5/04* (2006.01)
*B62D 5/00* (2006.01)
*B62D 15/02* (2006.01)

(52) U.S. Cl.
CPC ............ *B62D 5/003* (2013.01); *B62D 15/0215* (2013.01); *B62D 5/049* (2013.01); *B62D 5/0484* (2013.01); *B62D 5/0403* (2013.01); *B62D 5/001* (2013.01)
USPC ........................................... 180/446; 701/43

(58) Field of Classification Search
USPC ........................... 180/402, 444, 446; 257/254
See application file for complete search history.

(56) References Cited

U.S. PATENT DOCUMENTS

| | | | | |
|---|---|---|---|---|
| 4,437,531 A * | 3/1984 | Urabe | ........................... | 180/446 |
| 5,803,202 A * | 9/1998 | Bohner et al. | ................ | 180/443 |
| 6,763,738 B1 * | 7/2004 | Tsutsui et al. | ............ | 74/388 PS |
| 6,863,144 B2 * | 3/2005 | Brandt et al. | .................. | 180/333 |
| 7,128,011 B2 * | 10/2006 | Altland et al. | ................ | 114/162 |
| 7,207,411 B2 * | 4/2007 | Duits et al. | ..................... | 180/402 |
| 7,292,919 B2 * | 11/2007 | Sakai | .............................. | 701/41 |
| 7,463,000 B2 * | 12/2008 | Akiyama | ...................... | 318/560 |
| 7,568,549 B2 * | 8/2009 | Wun et al. | ..................... | 180/402 |
| 7,628,244 B2 * | 12/2009 | Chino et al. | .................. | 180/402 |
| 7,664,584 B2 * | 2/2010 | Chino et al. | ..................... | 701/41 |
| 7,806,225 B2 * | 10/2010 | Itoh | .............................. | 180/446 |
| 7,866,434 B2 * | 1/2011 | Shiino et al. | .................. | 180/411 |
| 8,010,254 B2 * | 8/2011 | Chai et al. | ....................... | 701/42 |
| 8,066,092 B2 * | 11/2011 | Shimizu et al. | ............... | 180/444 |
| 8,457,868 B2 * | 6/2013 | Tange et al. | .................... | 701/116 |
| 8,657,062 B2 * | 2/2014 | Tashiro | ........................ | 180/446 |
| 8,662,240 B2 * | 3/2014 | Higashi et al. | ................ | 180/402 |
| 2003/0146038 A1 * | 8/2003 | Mills et al. | .................... | 180/422 |
| 2005/0072621 A1 * | 4/2005 | Hara et al. | .................... | 180/444 |

(Continued)

FOREIGN PATENT DOCUMENTS

JP  A-10-278826   10/1998
JP  A-2004-090784  3/2004

*Primary Examiner* — John R Olszewski
*Assistant Examiner* — Tommy Worden
(74) *Attorney, Agent, or Firm* — Oliff PLC (57) ABSTRACT

A vehicle steering system includes: a steering mechanism that includes a steering member, a steering angle detecting unit and a direction detecting unit that detects a steering direction with reference to a neutral position of the steering member; a steered mechanism that includes a steered wheel and a turning actuator having a turning motor, and that is not mechanically coupled to the steering mechanism; and a control device that controls the turning motor and that, at the time of a failure of the steering angle detecting unit, controls the turning motor by determining a turning motor command value for controlling the turning motor on the basis of a detected signal from the direction detecting unit.

8 Claims, 6 Drawing Sheets

(56) References Cited

U.S. PATENT DOCUMENTS

| | | | |
|---|---|---|---|
| 2005/0279562 A1* | 12/2005 | Hara et al. | 180/402 |
| 2006/0200289 A1* | 9/2006 | Chino et al. | 701/41 |
| 2007/0045036 A1* | 3/2007 | Takeuchi et al. | 180/411 |
| 2007/0221434 A1* | 9/2007 | Chino et al. | 180/402 |
| 2009/0038876 A1* | 2/2009 | Ito et al. | 180/421 |
| 2009/0057050 A1* | 3/2009 | Shiino et al. | 180/412 |
| 2009/0114470 A1* | 5/2009 | Shimizu et al. | 180/444 |
| 2009/0319128 A1* | 12/2009 | Lauer et al. | 701/42 |
| 2010/0076650 A1* | 3/2010 | Spadafora et al. | 701/43 |
| 2011/0093164 A1* | 4/2011 | Kobayashi | 701/34 |
| 2011/0167940 A1* | 7/2011 | Shavrnoch et al. | 74/89.36 |
| 2012/0062245 A1* | 3/2012 | Bao et al. | 324/661 |
| 2013/0161116 A1* | 6/2013 | Tashiro | 180/446 |
| 2013/0161117 A1* | 6/2013 | Higashi et al. | 180/446 |
| 2013/0161118 A1* | 6/2013 | Yoshimoto | 180/446 |
| 2013/0253771 A1* | 9/2013 | Hayama | 701/43 |

* cited by examiner

VEHICLE STEERING SYSTEM

INCORPORATION BY REFERENCE

The disclosure of Japanese Patent Application No. 2012-032761 filed on Feb. 17, 2012 including the specification, drawings and abstract is incorporated herein by reference in its entirety.

BACKGROUND OF THE INVENTION

1. Field of the Invention

The invention relates to a vehicle steering system that turns a steered wheel on the basis of an operation of a steering member.

2. Description of Related Art

In recent years, there is known a vehicle steering system equipped with a so-called steer-by-wire system in which a steering member, such as a steering wheel, and steered wheels are not mechanically coupled to each other, and part of a steering transmission system is formed of an electrical path. Such a vehicle steering system includes a steering mechanism connected to a steering member and a steered mechanism that turns tires with the use of a turning motor for turning steered wheels. The steered mechanism executes drive control over the turning motor on the basis of a steering angle that is detected by a steering angle sensor that detects the steering angle of the steering member.

In the thus configured steer-by-wire system, it is important to take fail-safe measures in the case where there occurs an abnormality in the steering angle sensor. Particularly, at the time of a failure in the steering angle sensor, steering operation is difficult even when the steered mechanism is normal. Therefore, for example, a mechanical link that allows easy steering operation even at the time of a failure in the steering angle sensor as suggested in Japanese Patent Application Publication No. 2004-90784 (JP 2004-90784 A) or multiplexed sensors as suggested in Japanese Patent Application Publication No. 10-278826 (JP 10-278826 A) are provided. However, there is a problem that the number of components increases and the cost increases.

SUMMARY OF THE INVENTION

The invention provides a vehicle steering system that is able to achieve appropriate steering operation at the time of occurrence of a failure in a sensor of a so-called steer-by-wire system by adding a low-cost and simple member.

An aspect of the invention provides a vehicle steering system. The vehicle steering system includes: a steering mechanism that includes a steering member, a steering angle detecting unit, and a direction detecting unit for detecting a steering direction with reference to a neutral position of the steering member; a steered mechanism that includes a steered wheel and a turning actuator having a turning motor, and that is not mechanically coupled to the steering mechanism; and a control device that controls the turning motor and that, at the time of a failure of the steering angle detecting unit, controls the turning motor by determining a turning motor command value for controlling the turning motor on the basis of a detected signal from the direction detecting unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
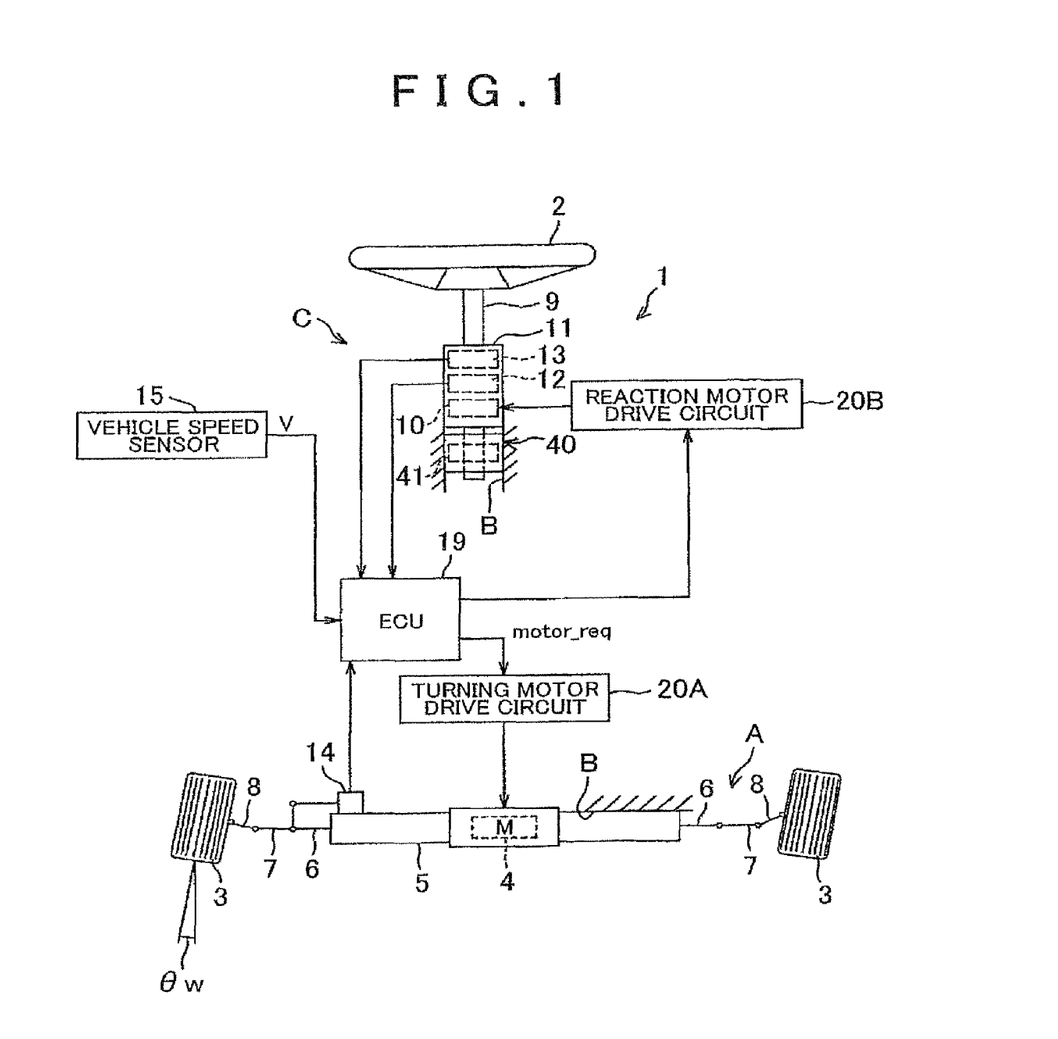
FIG. 1 is a schematic view that shows the schematic configuration of a vehicle steering system according to an embodiment of the invention.

Hereinafter, an embodiment of the invention will be described with reference to the accompanying drawings. FIG. 1 is a schematic view that shows the schematic configuration of a vehicle steering system according to the embodiment of the invention. As shown in FIG. 1, the vehicle steering system 1 constitutes a so-called steer-by-wire system in which a steering member 2, such as a steering wheel, is not mechanically coupled to steered wheels 3. In the vehicle steering system 1, the operation of a turning actuator 4 that is driven in response to the rotating operation of the steering member 2 is converted to the linear motion of a steered shaft 6 in a vehicle width direction. The steered shaft 6 is supported by a housing 5. The linear motion of the steered shaft 6 is converted to the turning motions of the right and left steered wheels 3. By so doing, a vehicle is turned. The position of the steering member 2, which corresponds to the position of the steered wheels 3 at the time when the vehicle is travelling straight ahead, is set as a steering neutral position.

The turning actuator 4, for example, includes a turning motor M. The driving force of the turning motor M (the rotational force of an output shaft) is converted to the axial linear motion of the steered shaft 6 by a ball screw mechanism. The linear motion of the steered shaft 6 is transmitted to tie rods 7 respectively coupled to both ends of the steered shaft 6, and pivots knuckle arms 8. By so doing, the direction of the steered wheels 3 supported by the knuckle arms 8 is changed.

The steered shaft 6, the tie rods 7 and the knuckle arms 8 constitute a steered mechanism A that turns the steered wheels 3. The housing 5 that supports the steered shaft 6 is fixed to a vehicle body B. The steering member 2 is coupled to a steering shaft 9 rotatably supported by the vehicle body B. A reaction motor 10 is assembled to the steering shaft 9. The reaction motor 10 is used to simulate reaction force, which is transmitted from a road surface, or the like, to the steered wheels 3, and apply the simulated reaction force to the steering member 2 as steering reaction force. The reaction motor 10 includes a motor, such as a brushless motor. The reaction motor 10 is accommodated inside a housing 11 fixed to the vehicle body B.

The vehicle steering system 1 includes a steering angle sensor 12. The steering angle sensor 12 is used to detect the steering angle of the steering member 2. A torque sensor 13 is provided at the steering shaft 9. The torque sensor 13 is used to detect a steering torque T applied to the steering member 2. The steering member 2, the steering shaft 9 and the steering angle sensor 12 constitute a steering mechanism C. The vehicle steering system 1 further includes a direction detecting mechanism 40 that detects a steering direction with reference to the steering neutral position of the steering member 2. As long as the direction detecting mechanism 40 is able to detect the steering direction, any structure may be employed as the structure of the direction detecting mechanism 40. In the present embodiment, as the steering shaft 9 rotates, the motion of the steering shaft 9 is converted to the vertical motion of a nut 41 installed so as to be vertically movable, and the steering direction is detected. The detailed structure and operation of the direction detecting mechanism 40 will be described later with reference to FIG. 2.

On the other hand, the vehicle steering system 1 includes a steered angle sensor 14 that detects the steered angle $\theta_w$ of the steered wheels 3. Other than these sensors, a vehicle speed sensor 15 that detects a vehicle speed V is provided. The vehicle speed sensor 15 may detect the vehicle speed V by detecting the rotation speed of a drive shaft or may detect the vehicle speed V by using a vehicle speed signal that is acquired through an in-vehicle local area network (LAN) (controller area network (CAN)).

Detected signals of these sensors 12 to 15 are input to an ECU 19 that serves as a control device that is an electronic control unit that includes a microcomputer. The ECU 19 drives the turning motor M for rotation by transmitting a command signal to a turning motor drive circuit 20A. In addition, the ECU 19 drives the reaction motor 10 for rotation by transmitting a command signal to a reaction motor drive circuit 20B. The ECU 19 includes a random access memory (RAM). The states, each of which is any one of rightward steering operation (a1 to a2), leftward steering operation (−a2 to −a1) and neutral state (−a1 to 0 to a1) and which are determined on the basis of whether each of the sensor voltages V1 and V2 is a high level or a low level, are stored in the RAM in time sequence.

Figure 2:
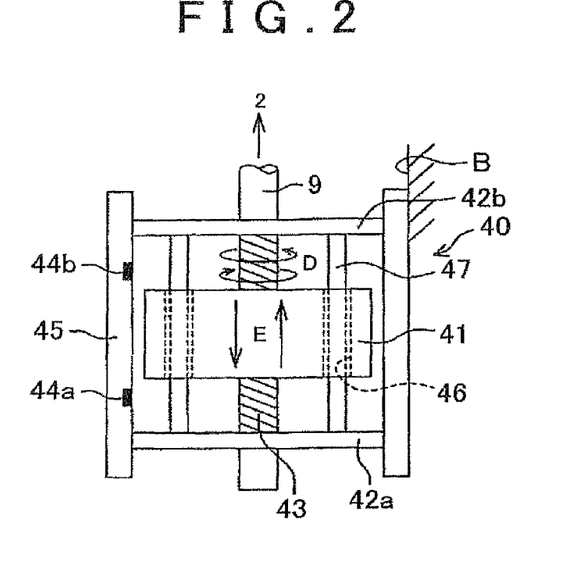
FIG. 2 is a schematic view that shows the structure of a direction detecting mechanism.

FIG. 2 shows the structure of the direction detecting mechanism 40. The direction detecting mechanism 40 that detects the steering direction includes a first plate member 42a, a second plate member 42b and a sensor support member 45. The first plate member 42a is installed at a side farther from the steering member 2, and has a first hole through which the steering shaft 9 extends. The second plate member 42b is installed at a side closer to the steering member 2, and has a second hole through which the steering shaft 9 extends. The sensor support member 45 is installed between the first plate member 42a and the second plate member 42b, and two proximity sensors 44a and 44b are arranged in the sensor support member 45. These first plate member 42a, second plate member 42b and sensor support member 45 are fixed to the vehicle body B.

A ball screw 43 is formed in part of the steering shaft 9 at a portion located between the first plate member 42a and the second plate member 42b. A nut 41 in which internal screw threads that incorporate a plurality of balls are formed at its center portion is installed between the first plate member 42a and the second plate member 42b in a state where the nut 41 is fitted to the ball screw 43. Two side holes 46 are formed in the nut 41. The side holes 46 each have a central axis in a direction parallel to the central axis of the nut 41. Rod-shaped members 47 are arranged between the first plate member 42a and the second plate member 42b so as to extend through the respective side holes 46 formed in the nut 41. The rod-shaped members 47 inhibit free rotation of the nut 41. By so doing, the nut 41 does not rotate on its axis but is able to move only in directions indicated by arrows E shown in FIG. 2.

Thus, when the steering shaft 9 rotates as indicated by arrows D shown in FIG. 2, the ball screw 43 of the steering shaft 9 rotates, and its motion is converted to the vertical movement in the directions indicated by the arrows E, of the nut 41 installed so as to be vertically movable with respect to the vehicle body B. The first plate member 42a and the second plate member 42b also function as stopper members for setting limits for the steering angle of the steering member 2 through contact with the side faces of the nut 41.

The proximity sensors 44a and 44b that detect an approach of the nut 41 are provided at the sensor support member 45 so as not to be contact with the nut 41. The proximity sensors 44a and 44b are respectively arranged at upper and lower locations on both sides of the location of the nut 41, which corresponds to the neutral position of the steering member 2. The principles of detection of these proximity sensors are not limited. For example, these sensors each may be a magnetic sensor that converts an approach of a magnetic substance to the presence or absence of a voltage. Alternatively, these sensors each may be, for example, an optical sensor that has a light emitting portion and a light receiving portion and that optically detects an object present in an optical path. Particularly, in the case of the latter optical sensors, the light emitting portion and the light receiving portion are desirably arranged to face each other on both sides of a location through which the nut 41 passes.

Figure 3A:
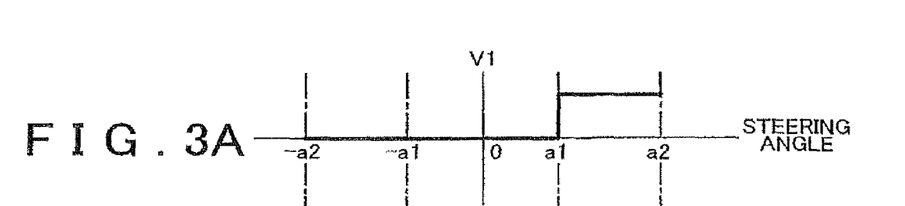
FIG. 3A and FIG. 3B are graphs that respectively show the correlation between a detected voltage of a proximity sensor and a steering angle of a steering member and the correlation between a detected voltage of another proximity sensor and a steering angle of the steering member.
Figure 3B:
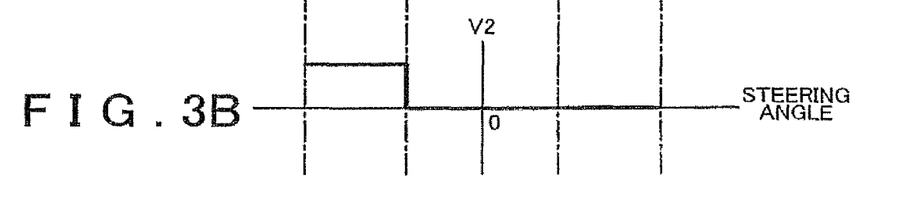

FIG. 3A and FIG. 3B are graphs that respectively show the correlation between a detected voltage of the proximity sensor 44a and a steering angle of the steering member 2 and the correlation between a detected voltage of the proximity sensor 44b and a steering angle of the steering member 2. FIG. 3A shows a detected voltage V1 of the proximity sensor 44a arranged in a region in which the nut 41 moves when the steering member 2 is rotated rightward. FIG. 3B shows a detected voltage V2 of the proximity sensor 44b arranged in a region in which the nut 41 moves when the steering member 2 is rotated leftward. The steering member 2 is rotated rightward from the neutral position, and the detected voltage V1 shifts from a low level to a high level at the time when the steering member 2 has reached an angle a1. The steering member 2 is rotated leftward from the neutral position, and the detected voltage V2 shifts from a low level to a high level at the time when the steering member 2 has reached an angle −a1. Both the detected voltages V1 and V2 are at a low level even when the steering member 2 is rotated within the range of angles −a1 to 0 to a1, including the neutral position. Each of the angles a2 and −a2 is an angle at the time when the nut 41 contacts the first plate member 42a or the second plate member 42b, and corresponds to a rotation limit angle of the steering member 2. In this way, by monitoring the detected voltages V1 and V2 of the sensors, it is possible to detect the steering state of the steering member 2.

Figure 4:
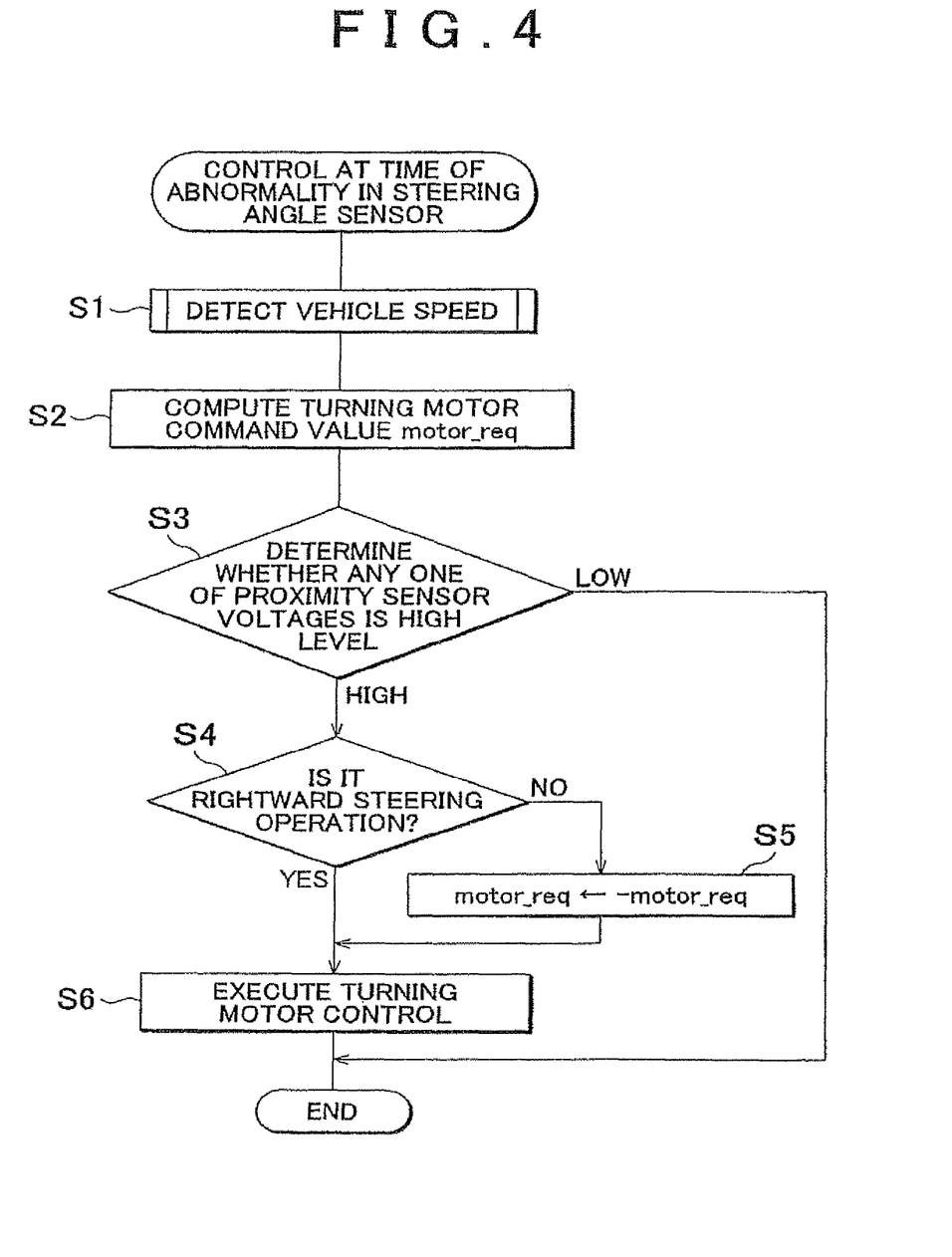
FIG. 4 is a flowchart for illustrating a turning control process that is executed by a control device at the time of an abnormality in a steering angle sensor.

FIG. 4 is a flowchart for illustrating a turning control process that is executed by the ECU 19 at the time of an abnormality in the steering angle sensor 12. First, the process of the ECU 19 when the steering angle sensor 12 is normal will be described. The ECU 19 selects and sets a current command value or rotation speed command value of the turning motor M on the basis of the steering angle of the steering member 2, which is detected by the steering angle sensor 12, and the vehicle speed V detected by the vehicle speed sensor 15. Then, the ECU 19 executes drive control over the turning motor M on the basis of the current command value or the rotation speed command value. By so doing, torque for moving the steered shaft 6 in a direction corresponding to the operation direction and operation amount of the steering member 2 is output from the turning motor M, and appropriate steering operation based on a travel condition of the vehicle and the operation mode of the steering member 2 is achieved. In addition, at the same time, the ECU 19 controls the reaction motor 10 via the reaction motor drive circuit 20B such that an adequate reaction force in a direction opposite to the direction in which the steering member 2 is steered is applied to the steering member 2 on the basis of the detected signals output from the sensors 12 to 15.

Turning control process that is executed by the ECU 19 in the case where there occurs an abnormality in the steering angle sensor 12 while the turning motor M is being subjected to drive control will be described. The vehicle speed is detected by the vehicle speed sensor 15 or through the in-vehicle LAN (step S1). The detected vehicle speed also includes a vehicle speed at the time of travelling backward. Subsequently, a turning motor command value motor_req for driving the turning motor M is computed (step S2). The turning motor command value motor_req has a sign. The turning motor command value motor_req is positive when the vehicle is turned rightward; whereas the turning motor command value motor_req is negative when the vehicle is turned leftward.

When the ECU 19 selects the current command value for driving the turning motor M, the turning motor command value motor_req is a current command value motor_current. When the ECU 19 selects the rotation speed command value, the turning motor command value motor_req is a rotation speed command value motor_speed. A method of calculating the command value will be described later with reference to FIG. 6. The sensor voltages V1 and V2 of the proximity sensors 44a and 44b of the direction detecting mechanism 40 are determined (step S3). When any one of the sensor voltages V1 and V2 is a high level, the process proceeds to step S4, and the steering direction of the steering member 2 is detected. As described with reference to FIG. 3, the detected steering direction includes three directions, that is, left (−a2 to −a1), neutral or close to neutral (−a1 to 0 to a1) and right (a1 to a2).

When the sensor voltage V1 is a high level, it is determined to be rightward steering operation, and then the process proceeds to step S6. When the sensor voltage V2 is a high level, it is determined to be leftward steering operation, the sign of the turning motor command value motor_req is inverted (step S5), and then the process proceeds to step S6. In step S6, the turning motor M is subjected to drive control by using the turning motor command value motor_req.

Figure 5:
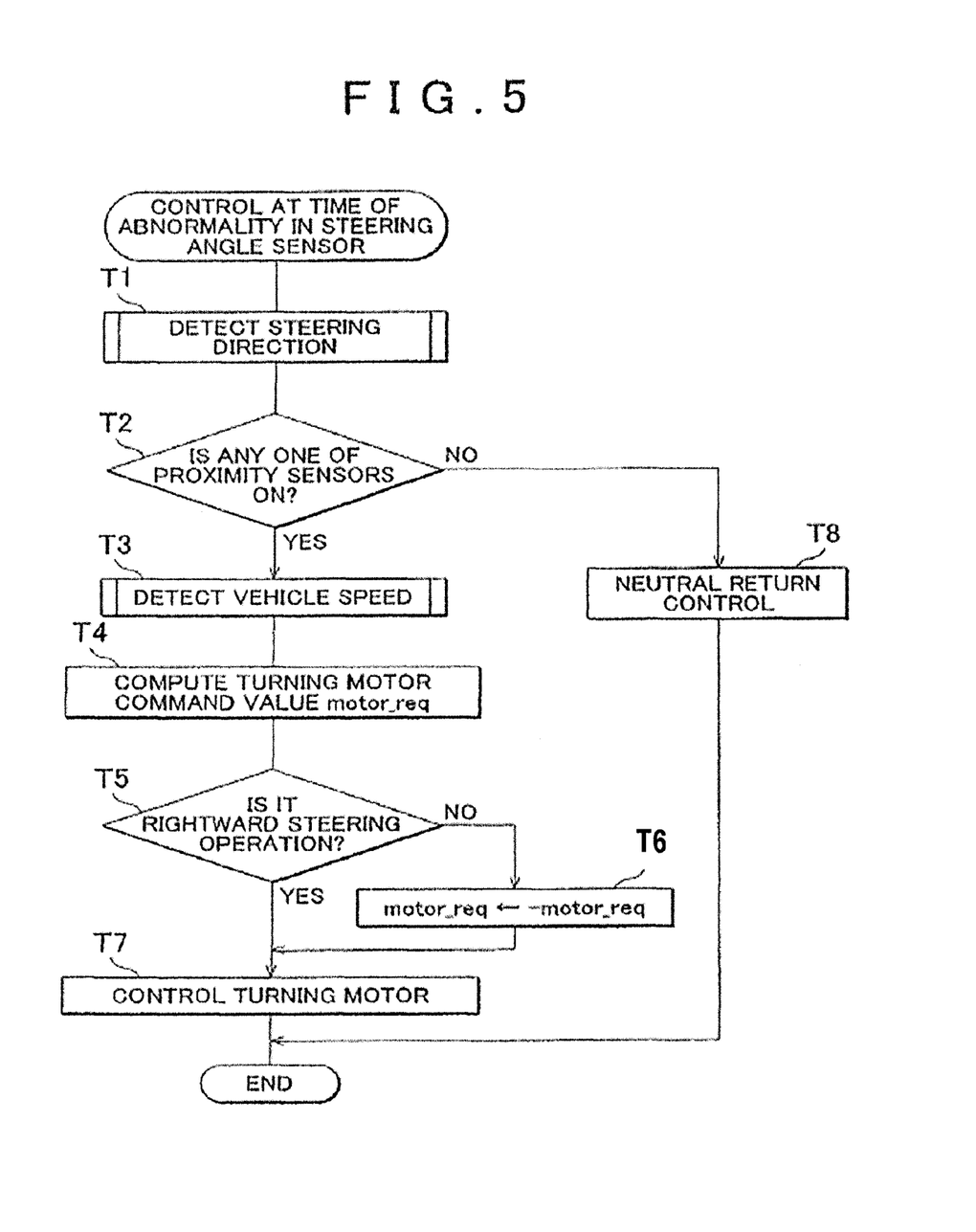
FIG. 5 is a flowchart for illustrating another turning control process that is executed by the control device at the time of an abnormality in the steering angle sensor.
Figure 6:
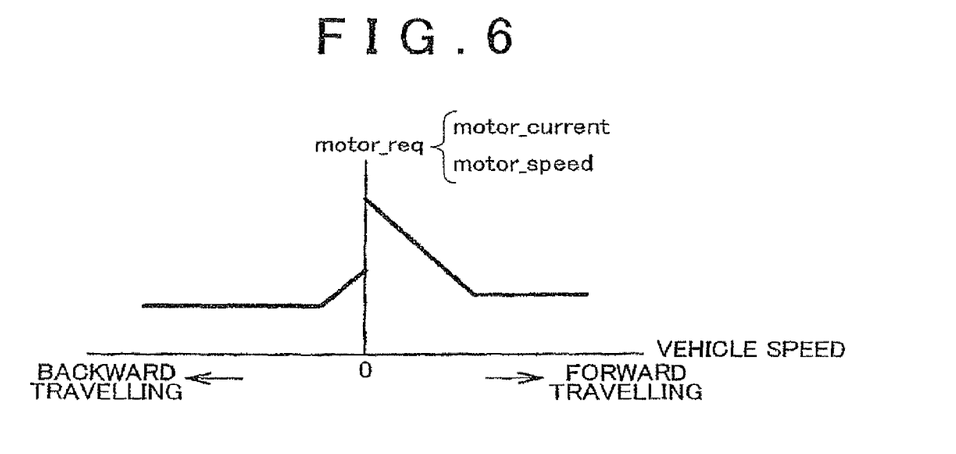
FIG. 6 is a graph for illustrating a method of calculating a turning motor command value for driving a turning motor on the basis of a vehicle speed.

Note that, in step S3, when the sensor voltages V1 and V2 of the direction detecting mechanism 40 each are a low level, it is determined that the steering position is neutral or closer to neutral, and drive control over the turning motor M is not executed. FIG. 5 is a flowchart for illustrating another turning control process that is executed by the ECU 19 at the time of an abnormality in the steering angle sensor 12. FIG. 5 is an alternative embodiment of FIG. 4. When the output signal of the direction detecting mechanism 40 shifts from a state where the output signal indicates the rightward or leftward steering direction to a state where the output signal indicates a steering direction at the neutral position, the ECU 19 controls the turning motor command value such that the turning motor returns to a neutral steered position. A deadband near the neutral position of the steering member 2 is set in the steering angle detecting mechanism 40. This will be specifically described below. When there occurs an abnormality in the steering angle sensor 12, the steering direction is detected by checking the sensor voltages V1 and V2 of the direction detecting mechanism 40 (step T1). That is, on the basis of whether each of the sensor voltages V1 and V2 is a high level or a low level, it is determined whether it is rightward steering operation (a1 to a2), leftward steering operation (−a2 to −a1) or neither and neutral state (−a1 to 0 to a1). This state is stored in the RAM of the ECU 19. When the sensor voltage V1 or V2 is a high level, that is, it is determined to be rightward steering operation or leftward steering operation (YES in step T2), the vehicle speed is detected through the vehicle speed sensor 15 (step T3). The detected vehicle speed also includes a vehicle speed at the time of travelling backward. Subsequently, a turning motor command value motor_req for driving the turning motor M is computed (step T4). The computed turning motor command value motor_req has a sign. The turning motor command value motor_req is positive when the vehicle is turned rightward; whereas the computed turning motor command value motor_req is negative when the vehicle is turned leftward. As described above, when the ECU 19 selects the current command value for driving the turning motor M, the turning motor command value motor_req is equal to a current command value motor_current. When the ECU 19 selects the rotation speed command value, the turning motor command value motor_req is equal to a rotation speed command value motor_speed. A method of calculating the command value will be described later with reference to FIG. 6. Subsequently, it is determined whether the steering direction is rightward steering or leftward steering on the basis of the result checked in step T1 (step T5). When the steering direction is rightward steering, the process proceeds to step T7. When the steering direction is not rightward steering, that is, when the steering direction is leftward steering, the sign of the turning motor command value motor_req is inverted (step T6), and then the process proceeds to step T7. In step T7, the turning motor M is subjected to drive control by using the turning motor command value motor_req. Next, neutral return control (step T8) in the case where it is determined in step T2 that both the sensor voltages V1 and V2 are a low level, that is, it is determined to be a neutral state, will be described. In this case, on the basis of data stored in the RAM of the ECU 19, it is determined whether rightward steering operation has been performed or leftward steering operation has been performed before entering the neutral state. When rightward steering operation has been performed before entering the neutral state, the ECU 19 controls the turning actuator 4 such that the turning actuator 4 gradually returns from a rightward steering state to a neutral state. That is, the ECU 19 rotates the turning motor M in the reverse direction to cause the steered shaft 6 to make a linear motion toward the neutral position. The speed of the linear motion may be kept at a constant speed or may be decreased as the steered shaft 6 approaches from the rightward steering state to the neutral state. Similarly, when leftward steering operation has been performed before entering the neutral state as well, the ECU 19 gradually returns the turning actuator 4 from a leftward steering state to the neutral state. In this way, in response to the fact that the steering member 2 starts to be returned to the neutral position after the steering member 2 is turned to the right or left end of the stroke (operated to rotation limit angle), the turning actuator 4 is gradually returned to the neutral state. By so doing, turning becomes gentle, and the driver experiences a less feeling of strangeness in steering operation. Particularly, when a vehicle in which a failure has occurred while travelling is stopped, it becomes relatively easy to drive the vehicle to a roadside safely. FIG. 6 is a graph for illustrating a method of calculating the turning motor command value motor_req for driving the turning motor M on the basis of the vehicle speed. The turning motor command value motor_req takes a maximum value when the vehicle speed is 0 at the time of travelling forward, decreases with an increase in vehicle speed, and keeps a minimum value when the vehicle speed is higher than or equal to a first threshold value. This is because larger force is required in order to turn tires as the vehicle speed decreases and, therefore, the vehicle is turned smoothly by increasing the turning motor command value motor_req. On the other hand, the command value is increased at the time of a low speed at which it is less dangerous even with a quick turn; whereas, on the contrary, by reducing the command value at a high speed, it is possible to achieve both safety and steerability.

In the case of travelling backward, the turning motor command value motor_req takes a maximum value when the vehicle speed is 0, decreases with an increase in vehicle speed, and keeps a minimum value when the vehicle speed is higher than or equal to a second threshold value. However, the absolute value of the turning motor command value motor_req is set so as to be smaller than that in the case of travelling forward. This is because, when the same turning motor command value motor_req as that at the time of travelling forward is set at the time of travelling backward, the vehicle turns excessively at the time of travelling backward and the steerability decreases. In addition, at the time of travelling backward, visibility is not better than that at the time of travelling forward, so it is possible to increase safety by not turning rapidly.

As described above, with the method of calculating the turning motor command value motor_req, during normal times, it is possible to drive the steered wheels through the steered mechanism. A to turn on the basis of the steering angle of the steering member 2. When there occurs an abnormality in the steering angle sensor 12, it is possible to control the turning motor M by determining the turning motor command value motor_req for controlling the turning motor M on the basis of the detected signal from the direction detecting mechanism 40 that detects a steering direction. Thus, even when a fail-safe steering angle sensor is not provided as a spare, it is possible to continue turning. In addition, the direction detecting mechanism 40 is allowed to have a simpler structure than a steering angle sensor, so it is possible to reduce cost.

Figure 7A:
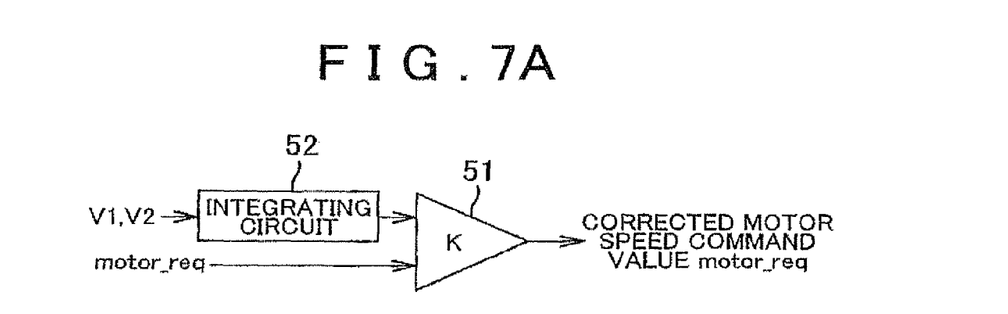
FIG. 7A is a block diagram that shows an integrating circuit that temporally integrates the detected signals of the proximity sensors and a correction circuit that corrects the turning motor command value on the basis of integral values.

A method of correcting the thus calculated turning motor command value motor_req will be described below. FIG. 7A is a view that shows an integrating circuit 52 and a correction circuit 51. The integrating circuit 52 is a circuit that temporally integrates detected signals of the proximity sensors 44a and 44b over a period of time during which the detected signals of the proximity sensors 44a and 44b indicate the same direction. The correction circuit 51 is a circuit that corrects the turning motor command value motor_req on the basis of integral values. That is, the integrating circuit 52 calculates a temporal integral value over a period of time during which the detected voltage V1 of the proximity sensor 44a keeps a high-level state, and calculates a temporal integral value over a period of time during which the detected voltage V2 of the proximity sensor 44b keeps a high-level state, and the correction circuit 51 corrects the turning motor command value motor_req using those integral values.

Figure 7B:
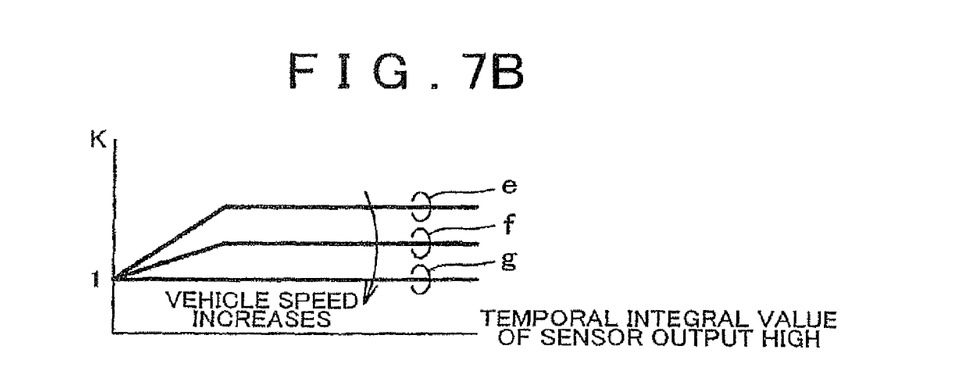
FIG. 7B is a graph that shows the correlation between a temporal integral value over a period of time during which a high-level state is kept and a correction gain.

In FIG. 7B, the abscissa axis represents a temporal integral value over a period of time during which a high-level state is kept, and the ordinate axis represents a correction gain K. As the temporal integral value increases, the correction gain K is increased as indicated by "e" and "f"; whereas, as the temporal integral value reduces, the correction gain K is set to a value close to 1. By so doing, at the time of initial steering operation or immediately after the steering direction is changed, it is possible to prevent a steep variation in the turning motor command value motor_req, so it is possible to prevent rapid turning, and the behavior of the vehicle becomes stable. After a lapse of time from when the steering direction is changed, it is possible to sufficiently adequately incorporate a driver's steering intention into the turning motor command value motor_req.

In the case of a relatively low speed, for example, when the vehicle speed is lower than or equal to 2 km/h, the rate of increase in the correction gain K is increased as indicated by "e" in FIG. 7B; whereas, in the case of a relatively high speed, for example, when the vehicle speed is higher than or equal to 10 km/h, the rate of increase in the correction gain K is not increased but is kept at a constant value "1" as indicated by "g" in FIG. 7B. By so doing, at a relatively high speed, a turn is stabilized by reducing the turning motor command value motor_req. At a relatively low speed, it is possible to make a quick and smooth turn by increasing the turning motor command value motor_req.

Figure 8A:
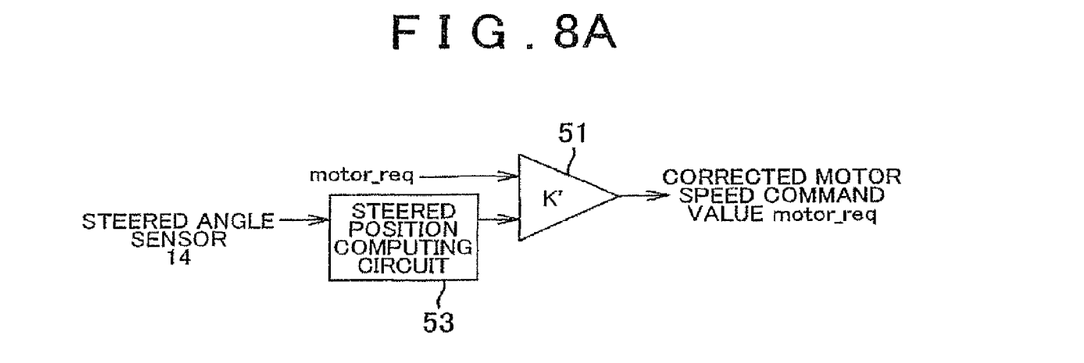
FIG. 8A is a block diagram that shows a steered position computing circuit that calculates a steered position with the use of a steered angle sensor provided in a steered mechanism and the correction circuit that corrects the turning motor command value.
Figure 8B:
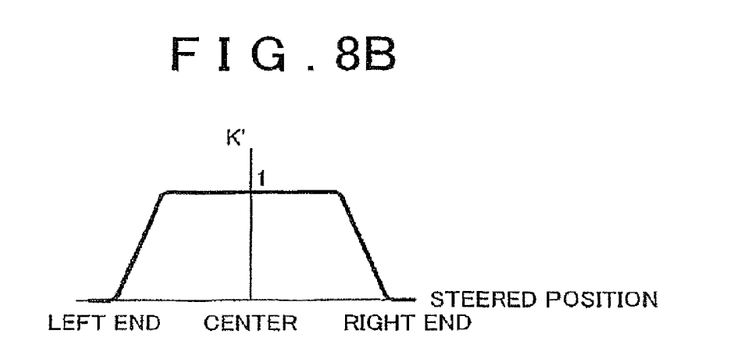
FIG. 8B is a graph that shows the correlation between a steered position detected by the steered angle sensor and a correction gain in the correction circuit.

FIG. 8A is a view that shows a steered position computing circuit 53 and the correction circuit 51. The steered position computing circuit 53 is a circuit that calculates a steered position with the use of the steered angle sensor 14 provided in the steered mechanism A. The correction circuit 51 is a circuit that corrects the turning motor command value motor_req. In the graph of FIG. 8B, the abscissa axis represents a steered position detected by the steered angle sensor 14, and the ordinate axis represents a correction gain K' in the correction circuit 51. The correction gain K' is varied on the basis of the steered position detected by the steered angle sensor 14. Particularly, the steered position can take a range from the left end to the right end through a rack stroke, and, as the steered position gets close to any one of the ends, the correction gain K' is reduced. By so doing, it is possible to prevent rapid turning behavior near the ends of the stroke.

The embodiment of the invention is described above; however, the invention is not limited to this configuration. Various modifications are applicable within the scope of the invention.

What is claimed is:

1. A vehicle steering system comprising:
   a steering mechanism that includes a steering member, a steering shaft, a steering angle detecting unit and a direction detecting unit that detects a steering direction with reference to a neutral position of the steering member;
   a steered mechanism that includes a steered wheel and a turning actuator having a turning motor, wherein the turning motor is never mechanically coupled to the steering mechanism; and
   a control device that controls the turning motor and that, at the time of a failure of the steering angle detecting unit, controls the turning motor by determining a turning motor command value for controlling the turning motor on the basis of a detected signal from the direction detecting unit, and wherein the direction detecting unit comprises a ball screw formed on the steering shaft, a nut fitted to the ball screw provided with side holes having a central axis that extends in a direction parallel to a central axis of the nut, rod shaped members that extend through the side holes, and sensors disposed at an upper location and a lower location on both sides of a location corresponding to the neutral position of the steering member, respectively.

2. The vehicle steering system according to claim 1, wherein the turning motor command value is varied on the basis of an integral value over a period of time during which the detected signal indicates a consistent direction.

3. The vehicle steering system according to claim 1, wherein the turning motor command value is varied on the basis of a vehicle speed.

4. The vehicle steering system according to claim 1, wherein the steered mechanism further includes a steered angle detecting unit, and the turning motor command value is changed on the basis of a magnitude of a steered angle signal detected by the steered angle detecting unit.

5. The vehicle steering system according to claim 1, wherein the control device controls the turning motor command value such that the turning motor returns to a neutral steered position when the detected signal from the direction detecting unit shifts from a state where the detected signal indicates a rightward or leftward steering direction to a state where the detected signal indicates the neutral position of the steering member.

6. The vehicle steering system according to claim 5, wherein a deadband near the neutral position of the steering member is set in the steering angle detecting unit.

7. The vehicle steering system according to claim 1, wherein the turning motor command value is set to different characteristics between at the time when a vehicle travels forward and at the time when the vehicle travels backward.

8. The vehicle steering system according to claim 1, wherein when the steering shaft rotates, the ball screw also rotates causing the nut to move in an axial direction of the steering shaft and the sensors detect movement of the nut.

* * * * *